US012625502B2

(12) United States Patent (10) Patent No.: US 12,625,502 B2
Huang et al. (45) Date of Patent: May 12, 2026

(54) PATROL INSPECTION METHOD, DEVICE AND COMPUTER-READABLE STORAGE MEDIUM

(71) Applicant: Lenovo (Beijing) Limited, Beijing (CN)

(72) Inventors: Shuting Huang, Beijing (CN); Fan Yang, Beijing (CN); Zepei Fan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 330 days.

(21) Appl. No.: 18/180,378

(22) Filed: Mar. 8, 2023

(65) Prior Publication Data

US 2023/0315095 A1 Oct. 5, 2023

(30) Foreign Application Priority Data

Mar. 29, 2022 (CN) .......................... 202210319828.8

(51) Int. Cl.
*G05D 1/246* (2024.01)
*G05D 1/00* (2006.01)
*G06T 7/73* (2017.01)

(52) U.S. Cl.
CPC ......... *G05D 1/2465* (2024.01); *G05D 1/0246* (2013.01); *G05D 1/0274* (2013.01); *G06T 7/75* (2017.01)

(58) Field of Classification Search
CPC . G05D 1/246–2469; B25J 11/00; B25J 5/007; B25J 9/1664; B25J 9/1697; B25J 13/089; G07C 1/20; G05B 2219/40298
See application file for complete search history.

(56) References Cited

U.S. PATENT DOCUMENTS 9,102,055 B1 * 8/2015 Konolige .................. G06T 7/13
9,427,874 B1 * 8/2016 Rublee ................ B25J 11/0075
(Continued)

FOREIGN PATENT DOCUMENTS

CN 105835059 A * 8/2016 ............ B25J 9/1664
CN 106054883 A * 10/2016 ........... G05D 1/0246
(Continued)

OTHER PUBLICATIONS

EPO machine translation of CN 106054883A (original CN document published Oct. 26, 2016) (Year: 2016).*
(Continued)

*Primary Examiner* — David A Testardi
(74) *Attorney, Agent, or Firm* — ANOVA LAW GROUP, PLLC

(57) ABSTRACT

A patrol inspection method includes: determining that an offset exists between a position of a to-be-inspected point and a position of a predetermined inspection point; obtaining a simulated three-dimensional (3D) object model by scanning a surrounding environment of a robot at the to-be-inspected point; comparing the simulated 3D object model and a pre-stored 3D object model to obtain adjustment information, the pre-stored 3D object model being 3D object information obtained by scanning the surrounding environment of the robot at the predetermined inspection point; based on the adjustment information, adjusting a pose of the robot; and capturing a two-dimensional (2D) image of an inspection target by the robot after adjustment.

18 Claims, 5 Drawing Sheets

(56)         References Cited

U.S. PATENT DOCUMENTS

| | | | | |
|---|---|---|---|---|
| 2009/0021351 A1 * | 1/2009 | Beniyama | .............. | G05D 1/024 |
| | | | | 901/1 |
| 2013/0108017 A1 * | 5/2013 | Golubovic | ........... | G01N 23/046 |
| | | | | 378/41 |
| 2015/0304634 A1 * | 10/2015 | Karvounis | ........ | G06F 18/21355 |
| | | | | 348/46 |
| 2016/0195390 A1 * | 7/2016 | Nissen | ...................... | B64F 5/60 |
| | | | | 901/44 |
| 2020/0240793 A1 * | 7/2020 | Li | ........................... | G01C 21/12 |

FOREIGN PATENT DOCUMENTS

| | | | | | |
|---|---|---|---|---|---|
| CN | 107943026 A | * | 4/2018 | .............. | G05D 1/024 |
| CN | 108287550 A | * | 7/2018 | ........... | G05D 1/0251 |
| CN | 109002045 A | * | 12/2018 | ........... | G05D 1/0246 |
| CN | 109471447 A | * | 3/2019 | ........... | G05D 1/0808 |
| CN | 109940603 A | * | 6/2019 | | |
| CN | 109976344 A | * | 7/2019 | | |
| CN | 110084842 A | * | 8/2019 | .............. | G06F 18/22 |
| CN | 110850872 A | * | 2/2020 | ........... | G05D 1/0214 |
| CN | 111633660 A | * | 9/2020 | | |
| CN | 111950553 A | * | 11/2020 | ........... | G06K 9/3216 |
| CN | 112549034 A | * | 3/2021 | | |
| CN | 113110446 A | * | 7/2021 | | |
| JP | 2022032711 A | * | 2/2022 | | |
| WO | WO-2017059263 A1 | * | 4/2017 | ........... | G05D 1/0274 |

OTHER PUBLICATIONS

EPO machine translation of CN 109471447A (original CN document published Mar. 15, 2019) (Year: 2019).*

EPO machine translation of CN 110850872A (original CN document published Feb. 28, 2020) (Year: 2020).*

Wikipedia article, "Simultaneous localization and mapping", Old revision dated Feb. 11, 2022, 10 pages (Year: 2022).*

EPO machine translation of JP2022032711A (original JP document published Feb. 25, 2022) (Year: 2022).*

* cited by examiner

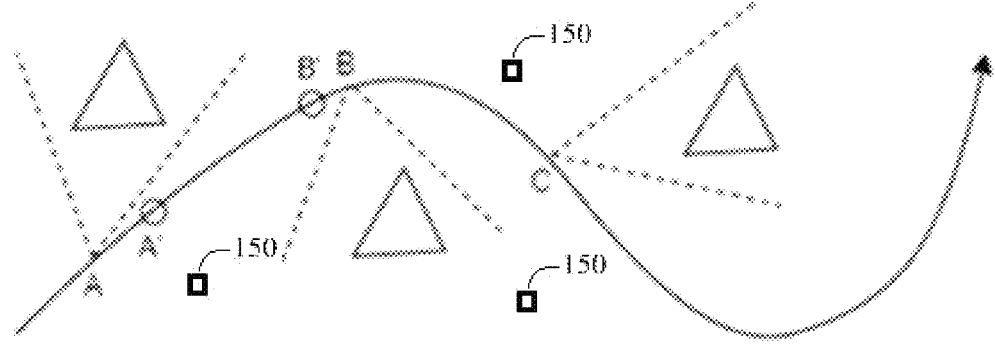
FIG. 1
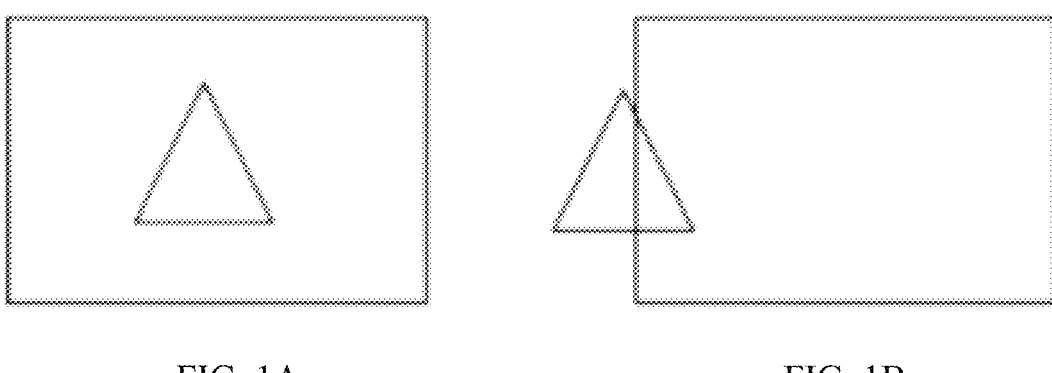
FIG. 1A                    FIG. 1B

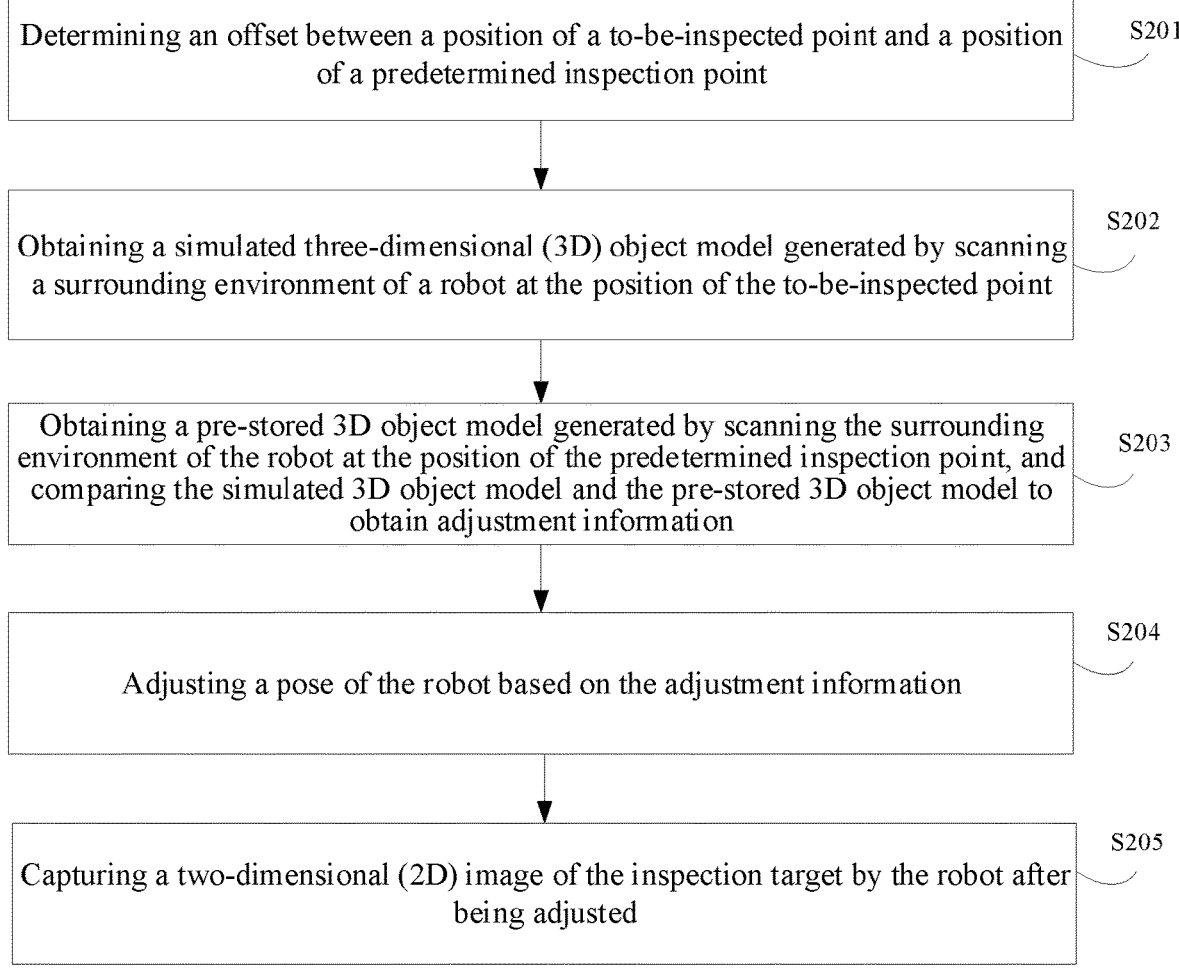

Determining an offset between a position of a to-be-inspected point and a position of a predetermined inspection point — S201

Obtaining a simulated three-dimensional (3D) object model generated by scanning a surrounding environment of a robot at the position of the to-be-inspected point — S202

Obtaining a pre-stored 3D object model generated by scanning the surrounding environment of the robot at the position of the predetermined inspection point, and comparing the simulated 3D object model and the pre-stored 3D object model to obtain adjustment information — S203

Adjusting a pose of the robot based on the adjustment information — S204

Capturing a two-dimensional (2D) image of the inspection target by the robot after being adjusted — S205

FIG. 2

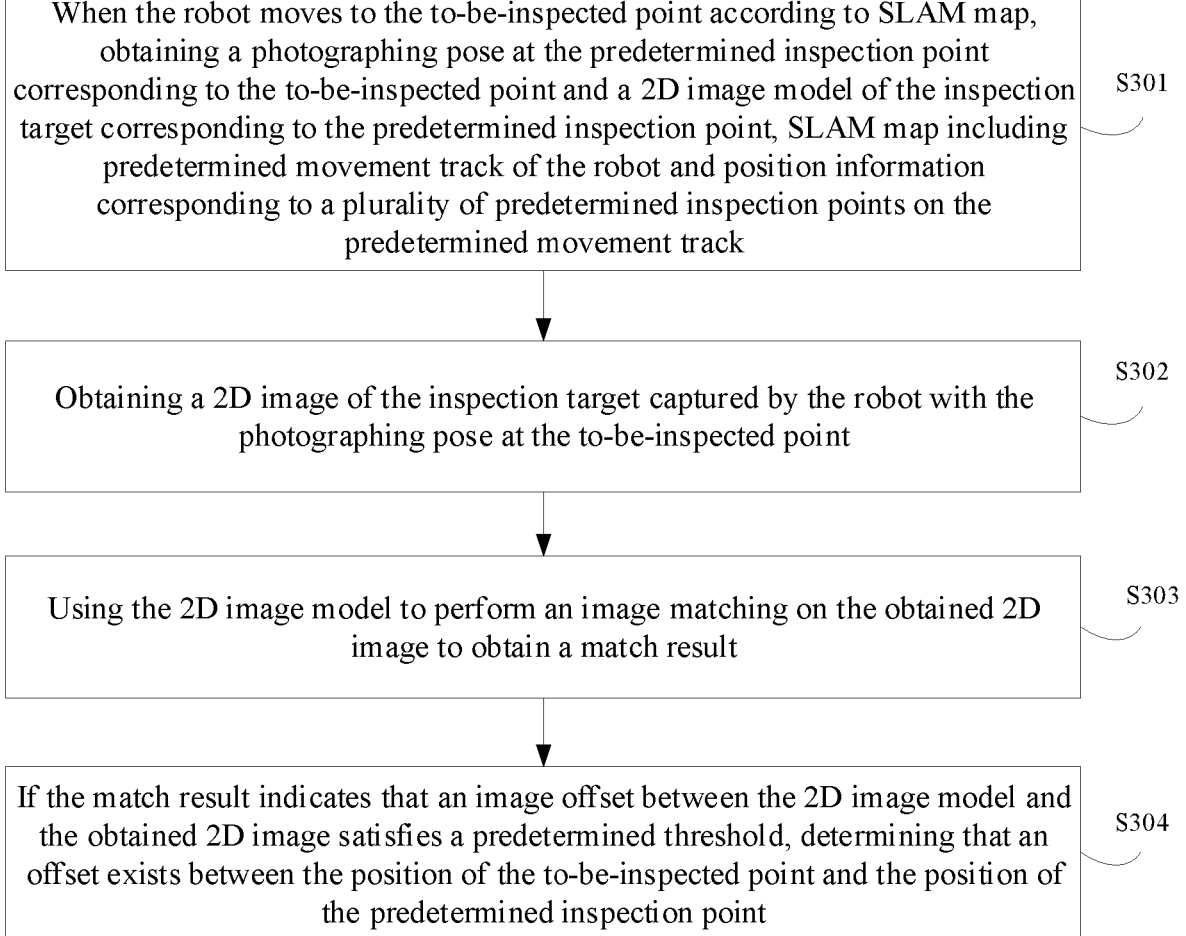

When the robot moves to the to-be-inspected point according to SLAM map, obtaining a photographing pose at the predetermined inspection point corresponding to the to-be-inspected point and a 2D image model of the inspection target corresponding to the predetermined inspection point, SLAM map including predetermined movement track of the robot and position information corresponding to a plurality of predetermined inspection points on the predetermined movement track

S301

Obtaining a 2D image of the inspection target captured by the robot with the photographing pose at the to-be-inspected point

S302

Using the 2D image model to perform an image matching on the obtained 2D image to obtain a match result

S303

If the match result indicates that an image offset between the 2D image model and the obtained 2D image satisfies a predetermined threshold, determining that an offset exists between the position of the to-be-inspected point and the position of the predetermined inspection point

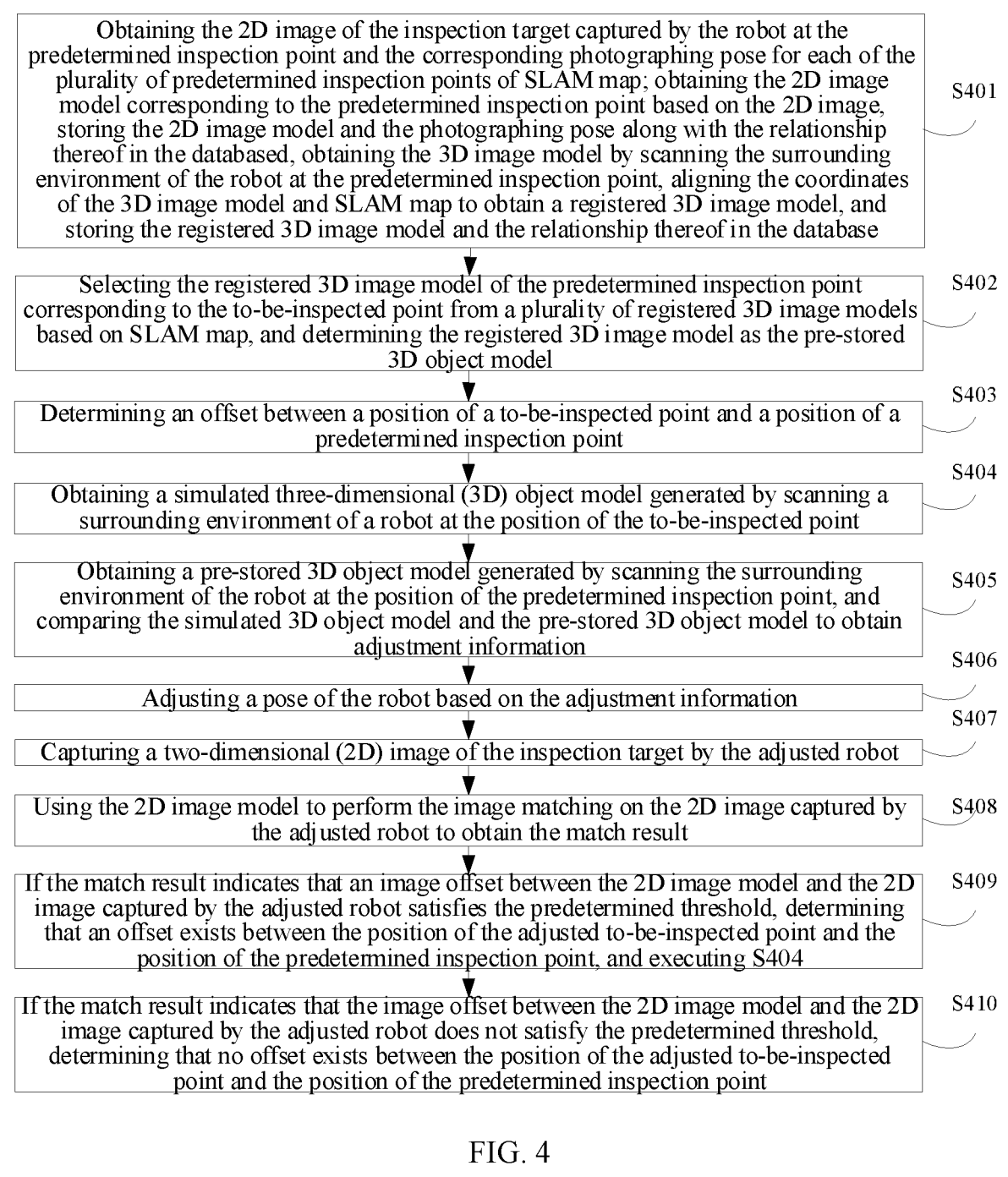

Obtaining the 2D image of the inspection target captured by the robot at the predetermined inspection point and the corresponding photographing pose for each of the plurality of predetermined inspection points of SLAM map; obtaining the 2D image model corresponding to the predetermined inspection point based on the 2D image, storing the 2D image model and the photographing pose along with the relationship thereof in the databased, obtaining the 3D image model by scanning the surrounding environment of the robot at the predetermined inspection point, aligning the coordinates of the 3D image model and SLAM map to obtain a registered 3D image model, and storing the registered 3D image model and the relationship thereof in the database — S401

Selecting the registered 3D image model of the predetermined inspection point corresponding to the to-be-inspected point from a plurality of registered 3D image models based on SLAM map, and determining the registered 3D image model as the pre-stored 3D object model — S402

Determining an offset between a position of a to-be-inspected point and a position of a predetermined inspection point — S403

Obtaining a simulated three-dimensional (3D) object model generated by scanning a surrounding environment of a robot at the position of the to-be-inspected point — S404

Obtaining a pre-stored 3D object model generated by scanning the surrounding environment of the robot at the position of the predetermined inspection point, and comparing the simulated 3D object model and the pre-stored 3D object model to obtain adjustment information — S405

Adjusting a pose of the robot based on the adjustment information — S406

Capturing a two-dimensional (2D) image of the inspection target by the adjusted robot — S407

Using the 2D image model to perform the image matching on the 2D image captured by the adjusted robot to obtain the match result — S408

If the match result indicates that an image offset between the 2D image model and the 2D image captured by the adjusted robot satisfies the predetermined threshold, determining that an offset exists between the position of the adjusted to-be-inspected point and the position of the predetermined inspection point, and executing S404 — S409

If the match result indicates that the image offset between the 2D image model and the 2D image captured by the adjusted robot does not satisfy the predetermined threshold, determining that no offset exists between the position of the adjusted to-be-inspected point and the position of the predetermined inspection point — S410

FIG. 4

PATROL INSPECTION METHOD, DEVICE AND COMPUTER-READABLE STORAGE MEDIUM

CROSS-REFERENCE TO RELATED APPLICATION

This application claims priority to Chinese Patent Application No. 202210319828.8, filed on Mar. 29, 2022, the entire content of which is incorporated herein by reference.

TECHNICAL FIELD

The present disclosure relates to the technical field of image processing technologies and, more particularly, to a patrol inspection method, a patrol inspection device, and a computer-readable storage medium.

BACKGROUND

In a patrol inspection task, a simultaneous location and mapping (SLAM) algorithm may be used to determine a location of an inspection robot after an inspection route is formulated. Photos of inspection targets may be taken at predetermined inspection locations to determine whether any of the inspection target appears abnormal.

However, due to various factors such as weather and environmental changes, SLAM determined locations may be deviated to prevent the inspection robot from making stops at the predetermined inspection locations, thereby causing the inspection targets to fall outside a shooting range of the inspection robot and resulting in false detection. Existing methods often include improving SLAM positioning accuracy, or adding markers in the inspection region. Due to resource constraints, these methods may not be feasible or have little effect.

SUMMARY

One aspect of the present disclosure provides a patrol inspection method. The patrol inspection method includes: determining that an offset exists between a position of a to-be-inspected point and a position of a predetermined inspection point; obtaining a simulated three-dimensional (3D) object model by scanning a surrounding environment of a robot at the to-be-inspected point; comparing the simulated 3D object model and a pre-stored 3D object model to obtain adjustment information, the pre-stored 3D object model being 3D object information obtained by scanning the surrounding environment of the robot at the predetermined inspection point; based on the adjustment information, adjusting a pose of the robot; and capturing a two-dimensional (2D) image of an inspection target by the robot after adjustment.

Another aspect of the present disclosure provides a patrol inspection device. The patrol inspection device includes a memory storing computer instructions; and a processor coupled to the memory. When being executed by the processor, the computer instructions cause the processor to: determine that an offset exists between a position of a to-be-inspected point and a position of a predetermined inspection point; obtain a simulated three-dimensional (3D) object model by scanning a surrounding environment of a robot at the to-be-inspected point; compare the simulated 3D object model and a pre-stored 3D object model to obtain adjustment information, the pre-stored 3D object model being 3D object information obtained by scanning the surrounding environment of the robot at the predetermined inspection point; based on the adjustment information, adjust a pose of the robot; and capture a two-dimensional (2D) image of an inspection target by the robot after adjustment.

Another aspect of the present disclosure provides a computer-readable storage medium storing computer instructions. When being executed by a processor, the computer instructions cause the processor to: determine that an offset exists between a position of a to-be-inspected point and a position of a predetermined inspection point; obtain a simulated three-dimensional (3D) object model by scanning a surrounding environment of a robot at the to-be-inspected point; compare the simulated 3D object model and a pre-stored 3D object model to obtain adjustment information, the pre-stored 3D object model being 3D object information obtained by scanning the surrounding environment of the robot at the predetermined inspection point; based on the adjustment information, adjust a pose of the robot; and capture a two-dimensional (2D) image of an inspection target by the robot after adjustment.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

FIG. 1 is a schematic diagram showing an inspection robot taking photos of inspection targets along a predetermined inspection route according to some embodiments of the present disclosure;

FIG. 1A is a schematic diagram of an image of an inspection target when SLAM determines robot positions correctly.

FIG. 1B is a schematic diagram of an image of another inspection target when SLAM determines robot positions incorrectly.

FIG. 2 is a flowchart of an exemplary patrol inspection method according to some embodiments of the present disclosure;

FIG. 3 is a flowchart of determining an offset between the position of the to-be-inspected point and the position of the predetermined inspection point according to some embodiments of the present disclosure;

FIG. 4 is a flowchart of another exemplary patrol inspection method according to some embodiments of the present disclosure.

DETAILED DESCRIPTION OF THE EMBODIMENTS

Figure 5:
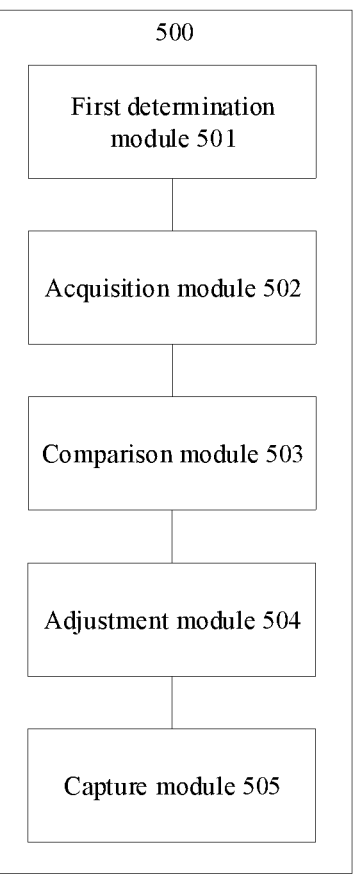
FIG. 5 is a schematic structural diagram of an exemplary patrol inspection device according to some embodiments of the present disclosure.

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

FIG. 1 is a schematic diagram showing an inspection robot taking photos of inspection targets along a predetermined inspection route according to some embodiments of the present disclosure. FIG. 1A, is a schematic diagram of an image of an inspection target when SLAM determines robot positions correctly. FIG. 1B is a schematic diagram of an image of another inspection target when SLAM determines robot positions incorrectly.

In a patrol inspection task, a control system controls a robot to move according to a predetermined inspection route. SLAM is used to perform real-time positioning of the robot to obtain robot position information. SLAM sends the robot position information to the control system. The control system compares the robot position information with predetermined inspection point position information. If a comparison result indicates the robot reaches a predetermined inspection point, the control system controls a camera disposed at the robot to take a photo of the inspection target at the predetermined inspection point. However, affected by various factors such as weather and environmental changes in the existing technology, SLAM positioning is often inaccurate. As shown in FIG. 1B, when SLAM positioning is abnormal, because the robot does not actually reach the predetermined inspection point, an offset may occur to an image of the inspection target captured by the robot. As shown in FIG. 1A, when SLAM positioning is normal, because the robot reaches the predetermined inspection point, no offset may occur to the image of the inspection target captured by the robot.

FIG. 2 is a flowchart of an exemplary patrol inspection method according to some embodiments of the present disclosure. As shown in FIG. 2, the patrol inspection method includes the following processes.

At S201, an offset between a position of a to-be-inspected point and a position of a predetermined inspection point is determined.

The to-be-inspected point is an inspection point reached by the robot when the robot is controlled to move to the predetermined inspection point. In some embodiments, at S201, the offset between the position of the to-be-inspected point and the position of the predetermined inspection point may be manually measured on site. The measured offset is inputted into the control system controlling the robot. In some other embodiments, the camera at the robot is controlled by the control system to capture a 2D image of the inspection target at the predetermined inspection point to build a corresponding 2D image model. The 2D image model is stored in a database. The camera at the robot is controlled by the control system to capture another 2D image of the inspection target at the to-be-inspected point to build another corresponding 2D image model. The two 2D image models are compared to determine the offset between the position of the to-be-inspected point and the position of the predetermined inspection point. The offset between the position of the to-be-inspected point and the position of the predetermined inspection point may also include an offset between different poses of the robot in addition to the offset between different positions of the robot.

At S202, a simulated three-dimensional (3D) object model generated by scanning a surrounding environment of a robot at the position of the to-be-inspected point is obtained.

In some embodiments, the control system scans the surrounding environment of the robot omni-directionally from various angles in advance at the to-be-inspected point to obtain the simulated 3D object model corresponding to the surrounding environment. In one example, all objects in the surrounding environment may be scanned omni-directionally from various angles to obtain the simulated 3D object model. In another example, certain markers (e.g., markers 150 as shown in FIG. 1) and/or the inspection target in the surrounding environment may be scanned omni-directionally from various angles to obtain the simulated 3D object model.

At S203, a pre-stored 3D object model generated by scanning the surrounding environment of the robot at the position of the predetermined inspection point is obtained, and the simulated 3D object model and the pre-stored 3D object model are compared to obtain adjustment information.

At S204, a pose of the robot is adjusted based on the adjustment information.

In some embodiments, the control system compares the simulated 3D object model and the pre-stored 3D object model. The comparison includes information such as position coordinate comparison and position orientation comparison to obtain a differential rotation parameter and a horizontal shift parameter of the robot. The differential rotation parameter and the horizontal shift parameter are determined to be the adjustment information. The control system adjusts the pose of the robot based on the adjustment information. In this case, the pose is used to refer to both the robot position information and the robot pose information. The robot pose information refers to pose information of the camera at the robot. An angle offset and a position offset between the simulated 3D object model and the pre-stored 3D object model are correlated to an angle offset and a position offset of the robot itself. Thus, based on the angle offset and the position offset between the simulated 3D object model and the pre-stored 3D object model, parameters that need to be adjusted for the pose of the robot can be obtained.

At S205, a two-dimensional (2D) image of the inspection target is captured by the robot after adjustment.

In some embodiments, based on the adjusted pose of the robot, the control system controls the camera at the robot to capture the 2D image of the inspection target.

In some embodiments, the 2D image model is used to perform an image match on the 2D image captured by the adjusted robot to obtain a match result. If the match result indicates that an image offset between the 2D image model and the 2D image captured by the adjusted robot satisfies a predetermined threshold, it is determined that an offset exists between the position of adjusted to-be-inspected point and the position of the predetermined inspection point. At this point, S202 and S203 are executed to recognize 3D objects. The adjusted information obtained based on 3D object recognition may be used to adjust the pose of the robot again.

If the match result indicates that the image offset between the 2D image model and the 2D image captured by the adjusted robot does not satisfy the predetermined threshold, it is determined that no offset exists between the position of adjusted to-be-inspected point and the position of the predetermined inspection point. At this point, the robot already reaches the position of the predetermined inspection point, and is able to accurately inspect the inspection target at the predetermined inspection point.

In the embodiments of the present disclosure, SLAM positioning and 3D object recognition positioning are combined to make the robot accurately reach the predetermined inspection point. Thus, the image of the inspection target can be accurately captured at the predetermined inspection point, the false detection can be avoided, and accuracy of the robot performing the inspection can be improved.

Further, in the embodiments of the present disclosure, the sequence numbers of the processes do not refer to the sequence of performing the processes. The sequence of performing the processes may be determined by functions being performed and intrinsic logics, and may not impose any restriction on implementation of the embodiments of the present disclosure.

FIG. 3 is a flowchart of determining an offset between the position of the to-be-inspected point and the position of the predetermined inspection point according to some embodiments of the present disclosure. The flowchart is obtained through optimization of previously described embodiments. As shown in FIG. 3, determining that the offset exists between the position of the to-be-inspected point and the position of the predetermined inspection point includes the following processes.

At S301, when the robot moves to the to-be-inspected point according to SLAM map, a photographing pose at the predetermined inspection point corresponding to the to-be-inspected point and a 2D image model of the inspection target corresponding to the predetermined inspection point are obtained. SLAM map includes predetermined movement track of the robot and position information corresponding to a plurality of predetermined inspection points on the predetermined movement track.

At S302, a 2D image of the inspection target captured by the robot with the photographing pose at the to-be-inspected point is obtained.

In some embodiments, SLAM map is configured in advanced. For example, a person moves the robot to each of the plurality of predetermined inspection points sequentially according to the predetermined inspection track, and records the positions of the plurality of predetermined inspection points, thereby obtaining SLAM map. At each of the plurality of predetermined inspection points, the person sets up the photographing pose of the camera to capture the 2D image of the inspection target. Then, SLAM map, the 2D images, the photographing poses, and the plurality of predetermined inspection points are stored in a database along with mapping relationships among them. Afterwards, the robot is controlled to move to a to-be-inspected point according to SLAM map. The to-be-inspected point is supposed to be a predetermined inspection point marked according to SLAM positioning. However, SLAM positioning may be inaccurate. Whether a current position of the robot is the actual predetermined inspection point needs to be verified. At this point, the current position of the robot is considered to be the to-be-inspected point. Then, the photographing pose corresponding to the predetermined inspection point is obtained to set up the camera to capture the 2D image of the inspection target at the to-be-inspected point.

At S303, the 2D image model is used to perform an image matching on the obtained 2D image to obtain a match result.

At S304, if the match result indicates that an image offset between the 2D image model and the obtained 2D image satisfies a predetermined threshold, it is determined that an offset exists between the position of the to-be-inspected point and the position of the predetermined inspection point.

In some embodiments, based on an image matching technique, the 2D image model is used to perform the image match on the obtained 2D image to obtain the match result. If the match result indicates that the image offset between the 2D image model and the obtained 2D image is greater than or equal to a predetermined threshold, it is determined that an offset exists between the to-be-inspected point and the predetermined inspection point. At this point, inaccurate SLAM navigation causes the robot unable to reach the predetermined inspection point. If the match result indicates that the image offset between the 2D image model and the obtained 2D image is smaller than the predetermined threshold, it is determined that no offset exists between the to-be-inspected point and the predetermined inspection point. At this point, accurate SLAM navigation causes the robot to reach the predetermined inspection point.

In the embodiments of the present disclosure, after the 2D image model of the predetermined inspection point and the photographing pose corresponding to the 2D image model are obtained, the photographing pose is used to capture the 2D image of the inspection target at the to-be-inspected point, and the image matching technique is used to perform the image match on the 2D image captured at the to-be-inspected point and the 2D image model. If the match result indicates that an image offset exists between the 2D image captured at the to-be-inspected point and the 2D image model, it is determined that the to-be-inspected point deviates from the predetermined inspection point. If the match result indicates that no image offset exists between the 2D image captured at the to-be-inspected point and the 2D image model, it is determined that the to-be-inspected point is actually located at the predetermined inspection point. Thus, determining whether the position of the to-be-inspected point is correct based on the image matching technique facilitates subsequent correction of the position of the to-be-inspected point, and improves the accuracy of the robot inspection in the inspection task. At the same time, in the embodiments of the present disclosure, the 2D image matching method is used to quickly determine whether the robot deviates from its course, and then the 3D image matching method is used to adjust the pose of the robot, thereby further improving an execution efficiency of the robot.

FIG. 4 is a flowchart of another exemplary patrol inspection method according to some embodiments of the present disclosure. The patrol inspection method is obtained through optimizing the previously described embodiments. As shown in FIG. 4, the patrol inspection method includes the following processes.

At S401, the 2D image of the inspection target captured by the robot at the predetermined inspection point and the corresponding photographing pose are obtained for each of the plurality of predetermined inspection points of SLAM map. The 2D image model corresponding to the predetermined inspection point is obtained based on the 2D image. The 2D image model and the photographing pose are stored in the databased along with the relationship thereof. The 3D image model is obtained by scanning the surrounding environment of the robot at the predetermined inspection point. The coordinates of the 3D image model and SLAM map are aligned to obtain a registered 3D image model. The registered 3D image model and the relationship thereof are stored in the database.

In some embodiments, inspection parameters in the process of inspecting need to be configured. The inspection parameters include SLAM map, the 2D image model at each predetermined inspection point and the photographing pose corresponding to the 2D image model, and the registered 3D image model at each predetermined inspection point. SLAM map, the 2D image model at each predetermined inspection point and the photographing pose corresponding to the 2D image model, and the registered 3D image model at each predetermined inspection point are stored in the database for subsequent correction of the position of the to-be-inspected point.

At S402, the registered 3D image model of the predetermined inspection point corresponding to the to-be-inspected point is selected from a plurality of registered 3D image models based on SLAM map. The registered 3D image model is determined as the pre-stored 3D object model.

In some embodiments, the coordinates of each of the plurality of predetermined inspection points can be obtained from SLAM map to calculate a distance between the to-be-inspected point and each of the plurality of predetermined inspection points. Because, each of the plurality of predetermined inspection points has a calculated distance, the predetermined inspection point corresponding to a shortest distance selected from a plurality of distances is determined as the predetermined inspection point corresponding to the to-be-inspected point. The registered 3D image model corresponding to the predetermined inspection point is selected from a plurality of registered 3D image models stored in the database, and the selected registered 3D image model is determined as the pre-stored 3D object model. Thus, the accuracy of the 3D object recognition and positioning is improved to facilitate the determination of the position of the to-be-inspected point.

At S403, the offset between the position of the to-be-inspected point and the position of the predetermined inspection point is determined.

At S404, the simulated 3D object model is obtained by scanning the surrounding environment of the robot at the to-be-inspected point.

At S405, the simulated 3D object model and the pre-stored 3D object model are compared to obtain the differential rotation parameter and the horizontal shift parameter, and the differential rotation parameter and the horizontal shift parameter are determined to be the adjustment information of the robot.

At S406, the pose of the robot is adjusted according to the adjustment information.

At S407, the 2D image of the inspection target is captured by the robot after adjustment.

S403, S404, S405, S406, and S407 in FIG. 4 are similar to S101, S102, S103, S104, and S105 in FIG. 1. The detail description thereof is omitted herein.

At S408, the 2D image model is used to perform the image matching on the 2D image captured by the adjusted robot to obtain the match result.

At S409, if the match result indicates that an image offset between the 2D image model and the 2D image captured by the adjusted robot satisfies the predetermined threshold, it is determined that an offset exists between the position of the adjusted to-be-inspected point and the position of the predetermined inspection point, and S404 is executed.

At S410, if the match result indicates that the image offset between the 2D image model and the 2D image captured by the adjusted robot does not satisfy the predetermined threshold, it is determined that no offset exists between the position of the adjusted to-be-inspected point and the position of the predetermined inspection point.

In some embodiments, to determine whether an offset exists between the position of the adjusted robot and the position of the predetermined inspection point, the 2D image of the inspection target needs to be recaptured by the robot with the adjusted pose. The recaptured 2D image and the 2D image model at the predetermined inspection point are compared based on the image matching technique to obtain the match result. The match result is used to determine whether the position of the adjusted robot is actually located at the predetermined inspection point.

In the embodiments of the present disclosure, the method of the 3D object recognition is introduced to build the 3D model at the predetermined inspection point. The 3D image of the inspection target captured by the robot at its current position and the 3D image model corresponding to the predetermined inspection point are compared. The 3D difference information such as angles and distances are compared to determine whether the inspection robot is located at the position of the predetermined inspection point. The difference information is used to control the inspection robot to move until iteratively calculated difference information is reduced within the predetermined threshold. The inspection robot at the adjusted position recaptures the 2D image of the inspection target. The recaptured 2D image and the 2D image model are compared to obtain the match result. Thus, the photographing position and the photographing angle of the inspection robot can be effectively calibrated, such that the robot is able to reach the predetermined inspection point to improve the inspection accuracy of the robot performing the inspection task. The embodiments of the present disclosure solve the technical problems in the existing technology such as the robot being unable to reach the predetermined inspection point caused by inaccurate SLAM positioning and the subsequent inspection errors.

FIG. 5 is a schematic structural diagram of an exemplary inspection device 500 according to some embodiments of the present disclosure. As shown in FIG. 5, the inspection device includes a first determination module 501 configured to determine whether an offset exists between the position of the to-be-inspected pint and the position of the predetermined inspection point, an acquisition module 502 configured to obtain the simulated 3D object model by scanning the surrounding environment of the robot at the to-be-inspected point, a comparison module 503 configured to compare the simulated 3D object model and the pre-stored 3D object model to obtain the adjustment information, where the pre-stored 3D object model is the 3D object information obtained by scanning the surrounding environment of the robot at the predetermined inspection point, an adjustment module 504 configured to adjust the 3D information of the robot based on the adjustment information, and a capture module 505 configured to capture the 2D image of the inspection target by the adjusted robot.

In some embodiments, the first determination module 501 includes a first acquisition unit, a second acquisition unit, a match unit, and a determination unit. The first acquisition unit is configured to obtain the photographing pose at the predetermined inspection point corresponding to the to-be-inspected point and the 2D image model of the inspection target corresponding to the predetermined inspection point when the robot moves to the to-be-inspected point according to SLAM map. The SLAM map includes predetermined movement track of the robot, and the position information corresponding the plurality of predetermined inspection points along the predetermined movement track. The second acquisition unit is configured to obtain the 2D image of the inspection target captured by the robot with the photographing pose at the to-be-inspected point. The match unit is configured to use the 2D image model to perform the image matching on the obtained 2D image to obtain the first match result. The determination unit is configured to determine that an offset exists between the position of the to-be-inspected point and the position of the predetermined inspection point if the first match result indicates that an image offset between the 2D image model and the obtained 2D image satisfies the predetermined threshold.

In some embodiments, the patrol inspection device further includes a match module configured to use the 2D image model to perform the image matching on the 2D image captured by the adjusted robot to obtain the second match result, a second determination module configured to determine that an offset exists between the position of the adjusted to-be-inspected point and the position of the predetermined inspection point if the second match result indicates that an image offset between the 2D image model and the 2D image captured by the adjusted robot satisfies the predetermined threshold, and a third determination module configured to determine that no offset exists between the position of the adjusted to-be-inspected point and the position of the predetermined inspection point if the second match result indicates that the image offset between the 2D image model and the 2D image captured by the adjusted robot does not satisfy the predetermined threshold.

In some embodiments, the pre-stored 3D object model may be obtained by: obtaining the 3D image model by scanning the surrounding environment of the robot at each of the plurality of predetermined inspection points on SLAM map, aligning the coordinates of the 3D image model with SLAM map to obtain the registered 3D image model, selecting the registered 3D image model for the predetermined inspection point corresponding to the to-be-inspected point from the plurality of registered 3D image models based on SLAM map, and determining the selected registered 3D image model as the pre-stored 3D object model.

In some embodiments, the comparison module 503 includes a comparison unit configured to compare the simulated 3D object model and the pre-stored 3D object model to obtain the differential rotation parameter and the horizontal shift parameter, and a determination unit configured to determine the differential rotation parameter and the horizontal shift parameter as the adjustment information of the robot at the current position.

In some embodiments, the patrol inspection device further includes a 2D image model building module. The 2D image model building module is configured to, for any predetermined inspection point on SLAM map, obtain the 2D image of the inspection target captured by the robot at the predetermined inspection point and the photographing pose, obtain the 2D image model corresponding to the predetermined inspection point based on the 2D image, and store the 2D image model and the photographing pose thereof in the database.

The patrol inspection device can be used to perform the patrol inspection method provided by the embodiments of the present disclosure, and includes the functional modules and beneficial effects for performing the patrol inspection method. For technical details that have not been described in detail, reference can be made to the description of the patrol inspection method.

The present disclosure also provides an electronic device. The electronic device includes a processor and a memory. The memory is configured to store computer instructions to be executed by the processor. The processor is configured to retrieve the computer instructions from the memory and execute the computer instructions to implement the patrol inspection method provided by the embodiments of the present disclosure.

In addition to the patrol inspection method and the patrol inspection device, the present disclosure also provides a computer program product including computer program instructions. When being executed by a processor, the computer program instructions may cause the processor to perform the processes described in the embodiments of the present disclosure for the patrol inspection method.

The computer program product may be program codes written in any combination of one or more programming languages to implement the embodiments of the present disclosure. The one or more programming languages include object-oriented programming languages such as Java and C++, and conventional procedural programming languages such as C and Python. The program codes may be completely executed by a user computing device, may be partially executed by the user computing device, may be executed as a standalone software package, may be partially executed by the user computing device and partially executed by a remote computing device, or may be completely executed by the remote computing device or a server.

In addition, the present disclosure also provides a computer-readable storage medium for storing computer program instructions. When being executed by a processor, the computer program instructions may cause the processor to perform the processes described in the embodiments of the present disclosure for the patrol inspection method.

The computer-readable storage medium may be a combination of one or more readable medium. The readable medium may be a readable signal medium or a readable storage medium. For example, the readable storage medium may include, but is not limited to, electrical, magnetic, optical, electromagnetic, infrared, semiconductor systems, devices, and components, or a combination thereof. Moreover, the readable storage medium may include: electrical connection including one or more electrical wires, a portable disk, a hard disk, a random-access memory (RAM), a read-only memory (ROM), an erasable programmable read-only memory (EPROM or flash memory), optical fiber, portable compact disk read-only memory (CD-ROM), an optical memory, a magnetic memory device, or a combination thereof.

The basic principles of the present disclosure have been described above in conjunction with various embodiments. However, it should be pointed out that the improvements, advantages, effects, etc. described in the specification are merely examples rather than limitations, and it should not be considered that the improvements, advantages, and effects, etc. must be possessed by each embodiment of the present disclosure. In addition, the specific details disclosed above are merely for the purpose of illustration and comprehension, rather than limitation, and the above details do not limit the embodiments of the present disclosure to be implemented by using the above specific details.

The block diagrams of devices, apparatuses, equipment and systems involved in the present disclosure are merely for illustration purpose, and are not intended to require or imply that they must be connected, arranged, configured in the manner shown in the block diagrams. As those skilled in the art may appreciate, the devices, apparatuses, equipment, systems may be connected, arranged, configured in any manner. Words such as "comprises", "includes", "has", etc. are open-ended words that mean "including but not limited to" and may be used interchangeably. Words such as "or" and "and" are used to refer to the word "and/or" and are used interchangeably therewith, unless the context clearly indicates otherwise. As used herein, the phrase "such as" refers to the phrase "such as but not limited to", and can be used interchangeably.

It should also be noted that in the device and method of the embodiments of the present disclosure, each component or each step can be disassembled and/or reassembled. The decompositions and/or re-combinations should be considered equivalents of the present disclosure.

The above description of the embodiments of the present disclosure is provided to enable any person skilled in the art to make or use the present disclosure. Various modifications to these embodiments will be readily apparent to those skilled in the art, and the generic principles defined herein may be applied to other embodiments without departing from the scope of the present disclosure. Thus, the present disclosure is not intended to be limited to the embodiments shown herein but is to be accorded the broadest scope consistent with the principles and novel features disclosed herein.

The foregoing specification has been presented for purposes of illustration and comprehension. Furthermore, the specification is not intended to limit the embodiments of the present disclosure to the forms disclosed herein. Although a number of exemplary aspects and embodiments have been discussed above, those skilled in the art will recognize certain variations, modifications, changes, additions and sub-combinations thereof.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not refer to an execution order. The execution order of the processes should be determined by their functions and internal logic, and should not be used to limit the embodiments of the present disclosure. The sequence numbers in the embodiments of the present disclosure are intended for description only, and do not represent the advantages and disadvantages of the embodiments.

In some embodiments, unless otherwise defined, the technical terms or scientific terms used in the description of the embodiments of the present disclosure should have the usual meanings understood by those skilled in the art to which the embodiments of the present disclosure belong. "first\second" and similar words used in the embodiments of the present disclosure do not indicate any order, quantity or importance, but are only used to distinguish similar components.

It should also be noted that in the specification, relational terms such as first and second are used only to distinguish one entity or operation from another, and do not necessarily require or imply that there is such actual relationship or order between those entities or operations. Moreover, the terms "comprising," "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article or apparatus that includes the element.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. A patrol inspection method, implemented at a robot, comprising:

moving to a to-be-inspected point according to a simultaneous location and mapping (SLAM) map, the SLAM map including a predetermined movement track of the robot and position information corresponding to a plurality of predetermined inspection points on the predetermined movement track, the to-be-inspected point corresponding to a predetermined inspection point of the plurality of predetermined inspection points;

determining that an offset exists between a position of the to-be-inspected point and a position of the predetermined inspection point;

obtaining a simulated three-dimensional (3D) object model by scanning a surrounding environment of the robot at the to-be-inspected point, the scanning the surrounding environment of the robot including scanning at least one marker in the surrounding environment, wherein the simulated 3D object model is obtained based at least in part on the at least one marker;

comparing the simulated 3D object model and a pre-stored 3D object model to obtain adjustment information, the pre-stored 3D object model being 3D object information obtained by scanning the surrounding environment of the robot at the predetermined inspection point, the pre-stored 3D object model being obtained by scanning the surrounding environment of the robot at the predetermined inspection point;

adjusting a pose of the robot based on the adjustment information, such that the robot moves to an adjusted to-be-inspected point after the adjustment of the pose of the robot; and capturing a first two-dimensional (2D) image of an inspection target by the robot after the adjustment of the pose of the robot.

2. The patrol inspection method according to claim 1, wherein determining that the offset exists between the position of the to-be-inspected point and the position of the predetermined inspection point comprises:

after the robot moves to the to-be-inspected point according to the SLAM map, obtaining a photographing pose of the predetermined inspection point corresponding to the to-be-inspected point, and a 2D image model of the inspection target corresponding to the predetermined inspection point;

obtaining a second 2D image of the inspection target captured by the robot with the photographing pose at the to-be-inspected point;

using the 2D image model to perform an image matching on the obtained second 2D image to obtain a first match result; and when the first match result indicates that an image offset between the 2D image model and the obtained second 2D image satisfies a predetermined threshold, determining that the offset exists between the position of the to-be-inspected point and the position of the predetermined inspection point.

3. The patrol inspection method according to claim 2, further comprising:

using the 2D image model to perform the image matching on the first 2D image captured by the robot after the adjustment of the pose of the robot to obtain a second match result;

when the second match result indicates that a first image offset between the 2D image model and the obtained first 2D image satisfies the predetermined threshold, determining that the offset exists between the position of the adjusted to-be-inspected point and the position of the predetermined inspection point; and when the second match result indicates that the first image offset between the 2D image model and the obtained first 2D image does not satisfy the predetermined threshold, determining that no offset exists between the position of the adjusted to-be-inspected point and the position of the predetermined inspection point.

4. The patrol inspection method according to claim 1, wherein the pre-stored 3D object model is obtained by:

obtaining a 3D image model by scanning the surrounding environment of the robot at each of the plurality of predetermined inspection points on the SLAM map;

at each of the plurality of predetermined inspection points, associating coordinates of the respective predetermined inspection point according to the SLAM map with the respective obtained 3D image model to obtain a respective registered 3D image model, such that a plurality of registered 3D image models are obtained for the plurality of predetermined inspection points;

selecting a first registered 3D image model for the predetermined inspection point corresponding to the to-be-inspected point from the plurality of registered 3D image models based on the SLAM map; and determining the selected first registered 3D image model as the pre-stored 3D object model.

5. The patrol inspection method according to claim 1, wherein comparing the simulated 3D object model and the pre-stored 3D object model to obtain the adjustment information comprises:

comparing the simulated 3D object model and the pre-stored 3D object model to obtain a differential rotation parameter and a horizontal shift parameter; and determining the differential rotation parameter and the horizontal shift parameter as the adjustment information of the robot.

6. The patrol inspection method according to claim 1, further comprising:

obtaining a respective third 2D image of a respective inspection target captured by the robot at each of the plurality of predetermined inspection points and a respective photographing pose corresponding to the respective predetermined inspection point;

based on the respective third 2D image, obtaining a respective 2D image model corresponding to each of the plurality of predetermined inspection points; and storing the respective 2D image model and the respective corresponding photographing pose along with a relationship thereof in a database.

7. A patrol inspection device, implemented at a robot, comprising:

a memory storing computer instructions; and a processor coupled to the memory;

wherein when being executed by the processor, the computer instructions cause the processor to:

cause the robot to move to a to-be-inspected point according to a simultaneous location and mapping (SLAM) map, the SLAM map including a predetermined movement track of the robot and position information corresponding to a plurality of predetermined inspection points on the predetermined movement track, the to-be-inspected point corresponding to a predetermined inspection point of the plurality of predetermined inspection points;

determine that an offset exists between a position of the to-be-inspected point and a position of the predetermined inspection point;

obtain a simulated three-dimensional (3D) object model by scanning a surrounding environment of the robot at the to-be-inspected point, the scanning the surrounding environment of the robot including scanning at least one marker in the surrounding environment, wherein the simulated 3D object model is obtained based at least in part on the at least one marker;

compare the simulated 3D object model and a pre-stored 3D object model to obtain adjustment information, the pre-stored 3D object model being 3D object information obtained by scanning the surrounding environment of the robot at the predetermined inspection point, the pre-stored 3D object model being obtained by scanning the surrounding environment of the robot at the predetermined inspection point;

based on the adjustment information, adjust a pose of the robot, such that the robot moves to an adjusted to-be-inspected point after the adjustment of the pose of the robot; and capture a first two-dimensional (2D) image of an inspection target by the robot after the adjustment of the pose of the robot.

8. The patrol inspection device according to claim 7, wherein when determining that the offset exists between the position of the to-be-inspected point and the position of the predetermined inspection point, the processor is further configured to:

after the robot moves to the to-be-inspected point according to the SLAM map, obtain a photographing pose of the predetermined inspection point corresponding to the to-be-inspected point, and a 2D image model of the inspection target corresponding to the predetermined inspection point;

obtain a second 2D image of the inspection target captured by the robot with the photographing pose at the to-be-inspected point;

use the 2D image model to perform an image matching on the obtained second 2D image to obtain a first match result; and when the first match result indicates that an image offset between the 2D image model and the obtained second 2D image satisfies a predetermined threshold, determine that the offset exists between the position of the to-be-inspected point and the position of the predetermined inspection point.

9. The patrol inspection device according to claim 8, wherein the processor is further configured to:

use the 2D image model to perform the image matching on the first 2D image captured by the robot after the adjustment of the pose of the robot to obtain a second match result;

when the second match result indicates that a first image offset between the 2D image model and the obtained first 2D image satisfies the predetermined threshold, determine that the offset exists between the position of the adjusted to-be-inspected point and the position of the predetermined inspection point; and when the second match result indicates that the first image offset between the 2D image model and the obtained first 2D image does not satisfy the predetermined threshold, determine that no offset exists between the position of the adjusted to-be-inspected point and the position of the predetermined inspection point.

10. The patrol inspection device according to claim 7, wherein the pre-stored 3D object model is obtained by:

obtaining a respective 3D image model by scanning the surrounding environment of the robot at each of the plurality of predetermined inspection points on the SLAM map;

at each of the plurality of predetermined inspection points, associating coordinates of the respective predetermined inspection point according to the SLAM map with the respective obtained 3D image model to obtain a respective registered 3D image model, such that a plurality of registered 3D image models are obtained for the plurality of predetermined inspection points;

selecting a first registered 3D image model for the predetermined inspection point corresponding to the to-be-inspected point from the plurality of registered 3D image models based on the SLAM map; and determining the selected first registered 3D image model as the pre-stored 3D object model.

11. The patrol inspection device according to claim 7, wherein when comparing the simulated 3D object model and the pre-stored 3D object model to obtain the adjustment information, the processor is further configured to:

compare the simulated 3D object model and the pre-stored 3D object model to obtain a differential rotation parameter and a horizontal shift parameter; and determine the differential rotation parameter and the horizontal shift parameter as the adjustment information of the robot.

12. The patrol inspection device according to claim 7, wherein the processor is further configured to:

obtain a respective third 2D image of a respective inspection target captured by the robot at each of the plurality of predetermined inspection points and a respective photographing pose corresponding to the respective predetermined inspection point;

based on the respective third 2D image, obtain a respective 2D image model corresponding to each of the plurality of predetermined inspection points; and store the respective 2D image model and the respective corresponding photographing pose along with a relationship thereof in a database.

13. A non-transitory computer-readable storage medium storing computer instructions, when being executed by a processor, the computer instructions causing the processor to:

cause a robot to move to a to-be-inspected point according to a simultaneous location and mapping (SLAM) map, the SLAM map including a predetermined movement track of the robot and position information corresponding to a plurality of predetermined inspection points on the predetermined movement track, the to-be-inspected point corresponding to a predetermined inspection point of the plurality of predetermined inspection points;

determine that an offset exists between a position of the to-be-inspected point and a position of the predetermined inspection point;

obtain a simulated three-dimensional (3D) object model by scanning a surrounding environment of the robot at the to-be-inspected point, the scanning the surrounding environment of the robot including scanning at least one marker in the surrounding environment, wherein the simulated 3D object model is obtained based at least in part on the at least one marker;

compare the simulated 3D object model and a pre-stored 3D object model to obtain adjustment information, the pre-stored 3D object model being 3D object information obtained by scanning the surrounding environment of the robot at the predetermined inspection point, the pre-stored 3D object model being obtained by scanning the surrounding environment of the robot at the predetermined inspection point;

based on the adjustment information, adjust a pose of the robot, such that the robot moves to an adjusted to-be-inspected point after the adjustment of the pose of the robot; and capture a first two-dimensional (2D) image of an inspection target by the robot after the adjustment of the pose of the robot.

14. The non-transitory computer-readable storage medium according to claim 13, wherein when determining that the offset exists between the position of the to-be-inspected point and the position of the predetermined inspection point, the processor is further configured to:

after the robot moves to the to-be-inspected point according to the SLAM map, obtain a photographing pose of the predetermined inspection point corresponding to the to-be-inspected point, and a 2D image model of the inspection target corresponding to the predetermined inspection point;

obtain a second 2D image of the inspection target captured by the robot with the photographing pose at the to-be-inspected point;

use the 2D image model to perform an image matching on the obtained second 2D image to obtain a first match result; and when the first match result indicates that an image offset between the 2D image model and the obtained second 2D image satisfies a predetermined threshold, determine that the offset exists between the position of the to-be-inspected point and the position of the predetermined inspection point.

15. The non-transitory computer-readable storage medium according to claim 14, wherein the processor is further configured to:

use the 2D image model to perform the image matching on the first 2D image captured by the robot after the adjustment of the pose of the robot to obtain a second match result;

when the second match result indicates that a first image offset between the 2D image model and the obtained first 2D image satisfies the predetermined threshold, determine that the offset exists between the position of the adjusted to-be-inspected point and the position of the predetermined inspection point; and when the second match result indicates that the first image offset between the 2D image model and the obtained first 2D image does not satisfy the predetermined threshold, determine that no offset exists between the position of the adjusted to-be-inspected point and the position of the predetermined inspection point.

16. The non-transitory computer-readable storage medium according to claim 13, wherein the pre-stored 3D object model is obtained by:

obtaining a 3D image model by scanning the surrounding environment of the robot at each of the plurality of predetermined inspection points on the SLAM map;

at each of the plurality of predetermined inspection points, associating coordinates of the respective predetermined inspection point according to the SLAM map with the respective obtained 3D image model to obtain a respective registered 3D image model, such that a plurality of registered 3D image models are obtained for the plurality of predetermined inspection points;

selecting a first registered 3D image model for the predetermined inspection point corresponding to the to-be-inspected point from the plurality of registered 3D image models based on the SLAM map; and determining the selected first registered 3D image model as the pre-stored 3D object model.

17. The non-transitory computer-readable storage medium according to claim 13, wherein when comparing the simulated 3D object model and the pre-stored 3D object model to obtain the adjustment information, the processor is further configured to:

compare the simulated 3D object model and the pre-stored 3D object model to obtain a differential rotation parameter and a horizontal shift parameter; and determine the differential rotation parameter and the horizontal shift parameter as the adjustment information of the robot.

18. The non-transitory computer-readable storage medium according to claim 13, wherein the processor is further configured to:

obtain a respective third 2D image of a respective inspection target captured by the robot at each of the plurality of predetermined inspection points and a respective photographing pose corresponding to the respective predetermined inspection point;

based on the respective third 2D image, obtain a respective 2D image model corresponding to each of the plurality of predetermined inspection points; and store the respective 2D image model and the respective corresponding photographing pose along with a relationship thereof in a database.

* * * * *